UNITED STATES PATENT OFFICE.

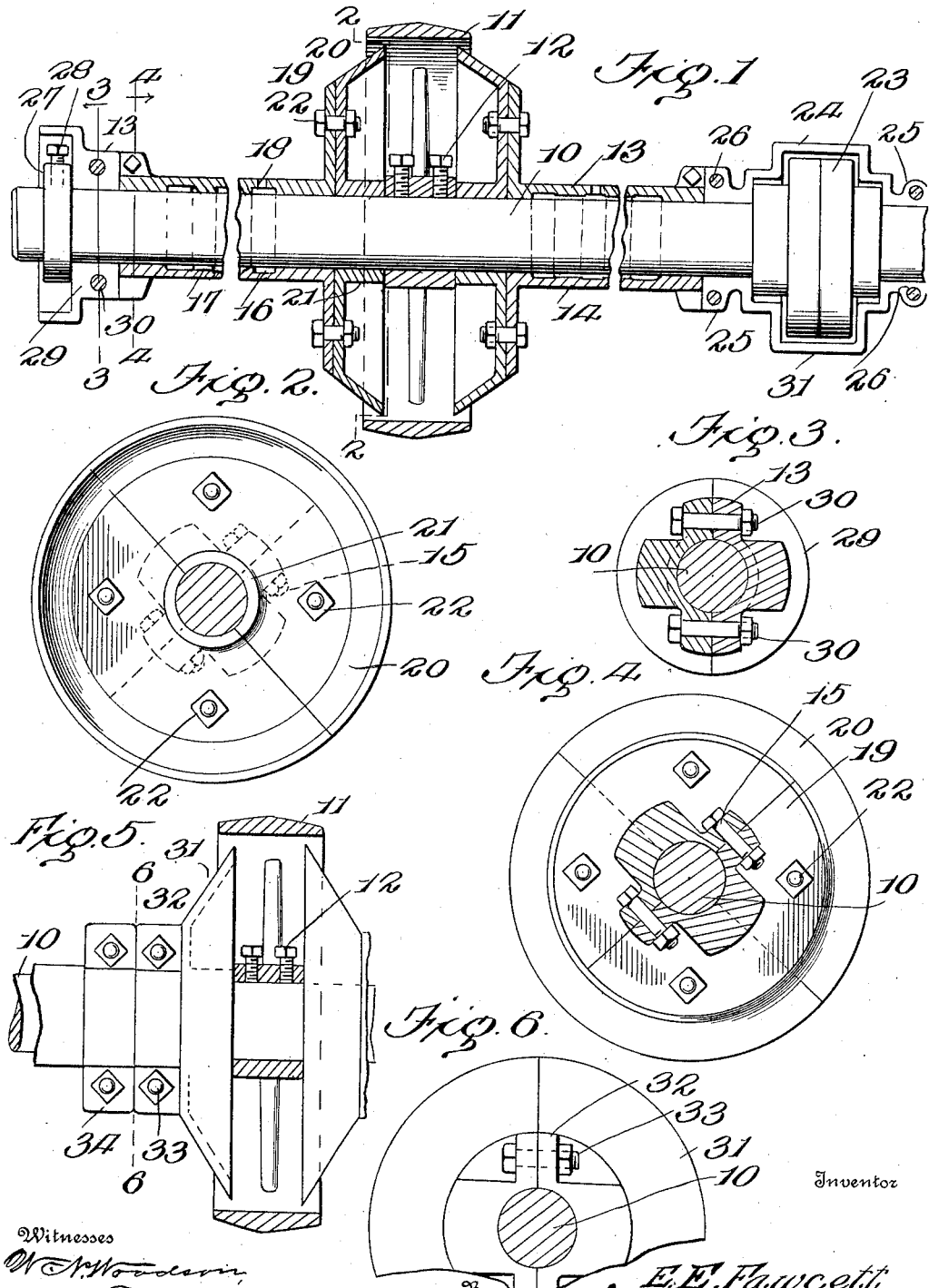

EMMETT E. FAWCETT, OF LAWRENCEBURG, INDIANA, ASSIGNOR OF ONE-HALF TO CHARLES LEIENDECKER, OF LAWRENCEBURG, INDIANA.

SHAFT-CASING.

1,003,096.      Specification of Letters Patent.     Patented Sept. 12, 1911.

Application filed May 12, 1909. Serial No. 495,386.

*To all whom it may concern:*

Be it known that I, EMMETT E. FAWCETT, citizen of the United States, residing at Lawrenceburg, in the county of Dearborn and State of Indiana, have invented certain new and useful Improvements in Shaft-Casing, of which the following is a specification.

This invention relates to shafting and refers particularly to a casing to be applied to the shaft in order to protect workmen who are brought into contact with the shaft and also to protect the shaft supports which frequently are displaced and broken by the sliding off of belts from pulleys when the same wrap or bind about the shaft.

The invention has for an object the provision of a casing for a shaft which is adapted to normally rotate therewith but when engaged by objects is permitted to be held from rotation, thereby preventing injury to the object brought into contact therewith and to permit of the uninterrupted rotation of the shaft.

The invention has for a further object the provision of a casing of this character which is of simple construction so that the same may be economically produced and brought into common practice.

For a full understanding of the invention reference is to be had to the following description and accompanying drawings, in which:—

Figure 1 is a longitudinal vertical section through the housing as disposed about a shaft and the members supported thereon. Fig. 2 is a transverse section on the line 2—2 of Fig. 1. Fig. 3 is a section on the line 3—3 of Fig. 1. Fig. 4 is a section on the line 4—4 of Fig. 1. Fig. 5 is a side elevation of a modified form of the housing as positioned about the shaft adjacent the pulley, the pulley being disclosed in section, and Fig. 6 is a fragmentary cross section on line 6—6 of Fig. 5.

Corresponding and like parts are referred to in the following description and indicated in all the views of the drawing by the same reference characters.

Referring to the drawing the numeral 10 designates a shaft which is mounted in any suitable manner and which carries a pulley 11 of common formation and which is secured thereto in the usual manner by set-screws 12 which extend through the hub of the pulley 11. The shaft 10 is provided about its outer face with semi-cylindrical casings 13 and 14 which are loosely fitted thereabout and are secured in such position by the employment of bolts 15 which are passed through enlarged or flanged extremities formed upon the sleeve sections 13 and 14 when the flanges are brought into registered relation. The sleeve sections are each provided with grooves 16 disposed in the inner faces of the same in registered relation and which are connected by channels 17 which are formed at intervals throughout the lengths of the sleeves for the purpose of conducting and distributing a lubricant which is passed through the side of the casing of the shaft in an opening 18 provided therefor. The sleeve sections of the casing are provided at one end with outwardly extended flanges 19, which when disposed in registered relation form a continuous annular flange against the outer face of which is positioned a flared disk 20, the flared disk 20 being mounted upon a sleeve 21 which is split, together with the disk 20, to admit of the positioning of the same about the shaft 10 at any point desired. The disk 20 is positioned in right angular relation to the sleeve sections 13 and 14 and is secured to the flanges 19 by the employment of bolts 22, thus forming a rigid locking means for both the sleeve sections 13 and 14 and the disk sections 20. The flared disk 20 is positioned adjacent the pulley 11, the flared portion thereof being extended within the pulley so as to direct a belt carried by the pulley 11 on to the sleeve sections 13 and 14 should the belt slide from the pulley. The shaft 10 is provided upon the opposite side of the pulley 11 with a pair of like sleeve sections 13 and 14 which are secured thereto by the bolts 15 passed through the flanged ends of the same and a second disk 20 is positioned against the opposite side of the pulley 11 and secured to the sleeve sections 13 and 14 adjacent the same in the manner before described.

The shaft 10 is disclosed as being provided with a coupling 23 which is disposed adjacent the end of the same and which is provided with a housing 24 which is formed of two sections which are flanged at their opposite extremities as at 25 and through which are positioned bolts 26 for the purpose of securing the sections of the housing 24 together. The housing 24 abuts against the flanges formed upon the adjoining ends of the casing sections 13 and 14 and is thereby held in registered relation about the coupling 23. The opposite ends of the shaft 10 are provided with collars 27 which are retained in adjusted position thereon through the medium of set-screws 28. The collars 27 are protected by means of split casings 29 which are flanged at their inner ends and through which are passed suitable bolts 30 for securing the sections loosely about the shaft 10. The casings 29 are loosely disposed about the shaft 10 and abut against the flanged extremities of the sections 13 and 14.

In Figs. 5 and 6 of the drawings is disclosed a modified form of flared disk which discloses the disk sections 31 as being provided with a split collar 32 secured by means of bolts 33 upon the shaft 10 and which is abutted against the flanges 34 formed upon the end of the shaft casing, by means of which the flared disk 31 is retained against the pulley 35. A casing of this character it is readily observed entirely closes the operative parts of the shaft, admitting only of the extension of the pulley 11 therefrom upon which the belt to drive the shaft is disposed. Should the belt for any reason be given a lateral tension to slide the same from the pulley 11 it would engage the flared disks 20, according to the side upon which the belt fell, when the belt would engage the casing sections 13 and 14 and ride thereover. Should the belt bind upon the casing the casing would be permitted to stop and would admit of the continual rotation of the shaft irrespective of the same without injuring the mounting upon which the shaft is disposed. Should the workmen about the casing accidentally engage any of the protruding parts of the same the casing would be caused to come to a stop and thereby prevent any accident or injury incident to such engagement.

This casing can be manufactured from any suitable material or combinations of materials which are adaptable for lightness and durability. Of course it will be understood that the casing may be made in various sizes and the parts thereof may be arranged to suit all manner of shafts and to cover all the projecting pins, collars, etc., which are carried thereby.

Having thus described the invention what is claimed as new is:—

The combination with a shaft, of a pulley secured to and mounted for rotation with the shaft, a sectional casing loosely encircling the shaft on each side of the pulley, the sections of each casing being provided with laterally extending flanges, sectional disks engaging the inner faces of the flanges and provided with sleeve sections bearing against the hub of the pulley, the intermediate portions of the sections of said disks overlapping the abutting edges of the flanges of the adjacent casing sections, and fastening devices piercing the disks and flanges for securing the casing sections in assembled position and the disks to said flanges, the marginal edges of the disks being inclined in the direction of and extended to the rim of the pulley.

In testimony whereof I affix my signature in presence of two witnesses.

EMMETT E. FAWCETT. [L. s.]

Witnesses:
CHARLES BURKART,
CHARLES J. LANG.

---

Copies of this patent may be obtained for five cents each, by addressing the "Commissioner of Patents, Washington, D. C."